(12) United States Patent
Chen

(10) Patent No.: US 10,246,018 B1
(45) Date of Patent: Apr. 2, 2019

(54) STEP INSTALLATION STRUCTURE OF THE TRUCK

(71) Applicants: Shu-Ling Chen, Tainan (TW); Daven Chang, New Hyde Park, NY (US)

(72) Inventor: Shu-Ling Chen, Tainan (TW)

(73) Assignees: Shu-Ling Chen, Tainan (TW); Daven ChangNY (US)

( * ) Notice: Subject to any disclaimer, the term of this patent is extended or adjusted under 35 U.S.C. 154(b) by 25 days.

(21) Appl. No.: 15/788,514

(22) Filed: Oct. 19, 2017

(51) Int. Cl.
| | | |
|---|---|---|
| *B60D 1/52* | (2006.01) | |
| *B60D 1/06* | (2006.01) | |
| *B60D 1/58* | (2006.01) | |
| *B60R 3/02* | (2006.01) | |
| *B60R 9/06* | (2006.01) | |
| *B60R 3/00* | (2006.01) | |

(52) U.S. Cl.
CPC .................................. *B60R 3/007* (2013.01)

(58) Field of Classification Search
CPC ... B60D 1/06; B60D 1/07; B60D 1/52; B60D 1/58; B60D 1/241; B60R 3/007; B60R 3/02; B60R 9/06
See application file for complete search history.

(56) References Cited

U.S. PATENT DOCUMENTS

| | | | | |
|---|---|---|---|---|
| 6,390,344 | B1* | 5/2002 | Edgerly .................... | B60R 9/06 224/402 |
| 2006/0214391 | A1* | 9/2006 | Columbia ................ | B60D 1/06 280/491.5 |
| 2008/0042394 | A1* | 2/2008 | Park ......................... | B60R 3/02 280/166 |
| 2008/0179861 | A1* | 7/2008 | Columbia ................ | B60D 1/06 280/477 |
| 2009/0014983 | A1* | 1/2009 | McKendry ............. | B60D 1/241 280/506 |
| 2010/0201102 | A1* | 8/2010 | Weaver .................. | B60D 1/025 280/506 |
| 2016/0272229 | A1* | 9/2016 | Buckner ................... | B62B 3/02 |
| 2018/0111431 | A1* | 4/2018 | MacNeil .................. | B60D 1/58 |

* cited by examiner

*Primary Examiner* — Bryan A Evans
(74) *Attorney, Agent, or Firm* — J.C. Patents

(57) ABSTRACT

A step installation structure of the truck includes at least a step support and a fixing member. Said step support is provided with a base for setting with the step assembly, a frame member is provided on the rear side of the base, which is used to insert inside the receiver hitch of the truck; said frame member is set with a plurality of perforations. Said fixing member is provided with a clamp body and a threaded bolt, the clamp body is set with a clip plate and a push plate which are arranged perpendicular to each other, the clip plate and the push plate are provided with a screw nut thereon separately; the end of the threaded bolt is provided with an anti-shedding member. Therefore, with the innovative fixing member, the step support can be more securely combined with the truck.

14 Claims, 10 Drawing Sheets

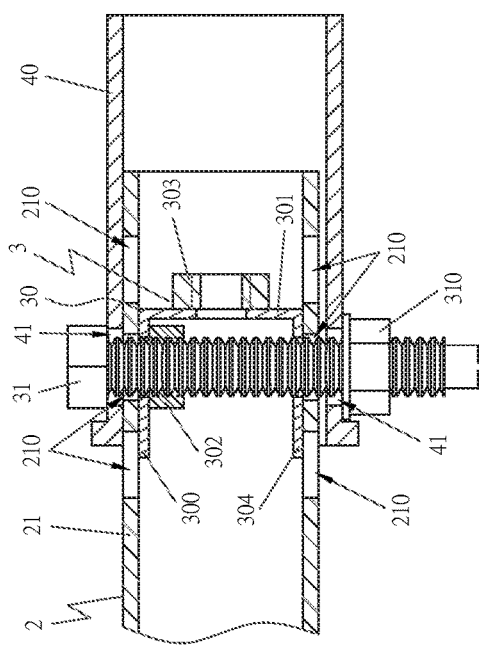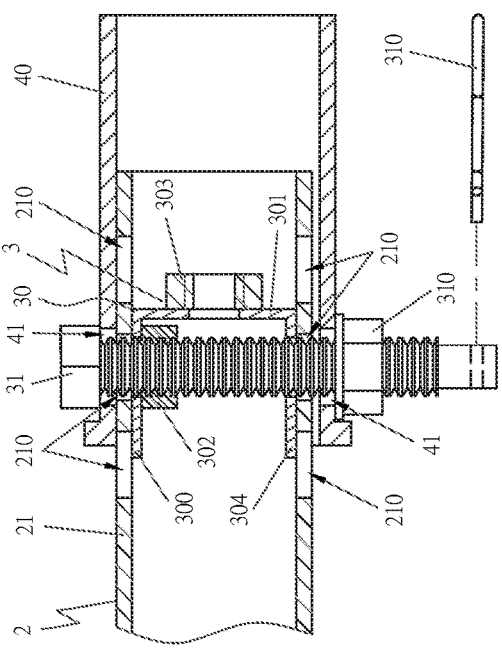

US 10,246,018 B1

STEP INSTALLATION STRUCTURE OF THE TRUCK

BACKGROUND OF THE INVENTION

1. Field of the Invention

This invention relates to a step installation structure of the truck, particularly to an innovative installation structure which can be easily and quickly to mount the step assembly on the truck.

2. Description of the Prior Art

At present, the step installation structure (such as a rear step or side step) of a truck (such as a pickup truck), as U.S. Pat. No. 9,381,863 B2, it disclose a step attachment 10 which is provided with a first frame member 15, a pin opening 19 is provided near a front end 20 of the first frame member 15 for receiving a hitch pin 21 to secure the first frame member 15 within the receiver hitch 14 of the pickup truck.

However, since the hitch pin 21 can only prevent the first frame member 15 separating from the receiver hitch 14, it is impossible to tightly fix the first frame member 15 inside the receiver hitch 14. So that, the first frame member 15 will shake in the receiver hitch 14, causing the step attachment 10 in the use of very unstable, and will produce metal colliding noises, when the hitch pin 21 is inserted into the pin opening 19. Moreover, the shacking between the first frame member 15 and the receiver hitch 14 will also make the step attachment 10 easier to damage.

For this reason, the inventor of this invention, having much experience in designing and manufacturing truck steps and its related products, understands and researches the problem of the foregoing truck step installation structure and hence devised this invention.

SUMMARY OF THE INVENTION

The objective of this invention is to offer a step installation structure of the truck, which is used an innovative fixing member to mount the step support more securely with the truck. Moreover, the step support will not shake in the receiver hitch of the truck, and the installation method is very simple and convenient and with the best safety and durability.

The step installation structure of the truck in the present invention includes at least a step support and a fixing member. Said step support is provided with a base for setting with the step assembly, a frame member is provided on the rear side of the base, which is used to insert inside the receiver hitch of the truck; said frame member is set with a plurality of perforations. Said fixing member is provided with a clamp body and a threaded bolt, the clamp body is set with a clip plate and a push plate which are arranged perpendicular to each other, the clip plate and the push plate are provided with a screw nut thereon separately; the end of the threaded bolt is provided with an anti-shedding member.

The step installation structure of the truck of present invention, among which said perforations may be a long slot to make the frame element has a stepless adjustment function.

The step installation structure of the truck of present invention, among which said the clamp body is provided with at least one support plate to increase the structural strength of the fixing member.

BRIEF DESCRIPTION OF DRAWINGS

This invention will be better understood by referring to the accompanying drawings, wherein:

FIG. 15 is an installation operation view of the fixing member in the present invention;

FIG. 16 is an installation operation view of the fixing member in the present invention.

DETAILED DESCRIPTION OF THE PREFERRED EMBODIMENT

A preferred embodiment of the step installation structure of the truck in the present invention, as shown in FIG. 1-17, includes at least a step support 2 and a fixing member 3 as main components combined together.

Figure 1:
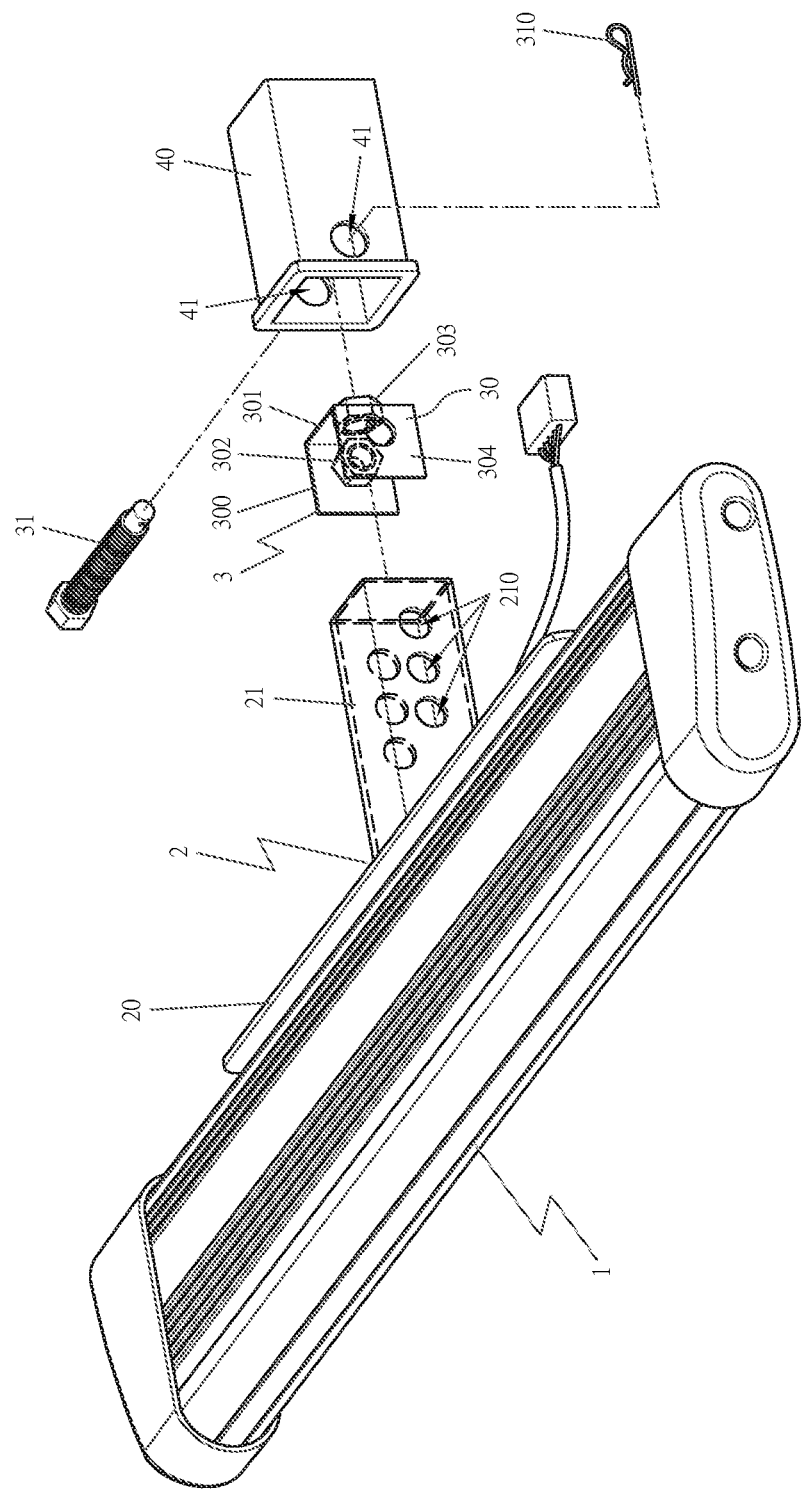
FIG. 1 is an exploded perspective view in the present invention.
Figure 2:
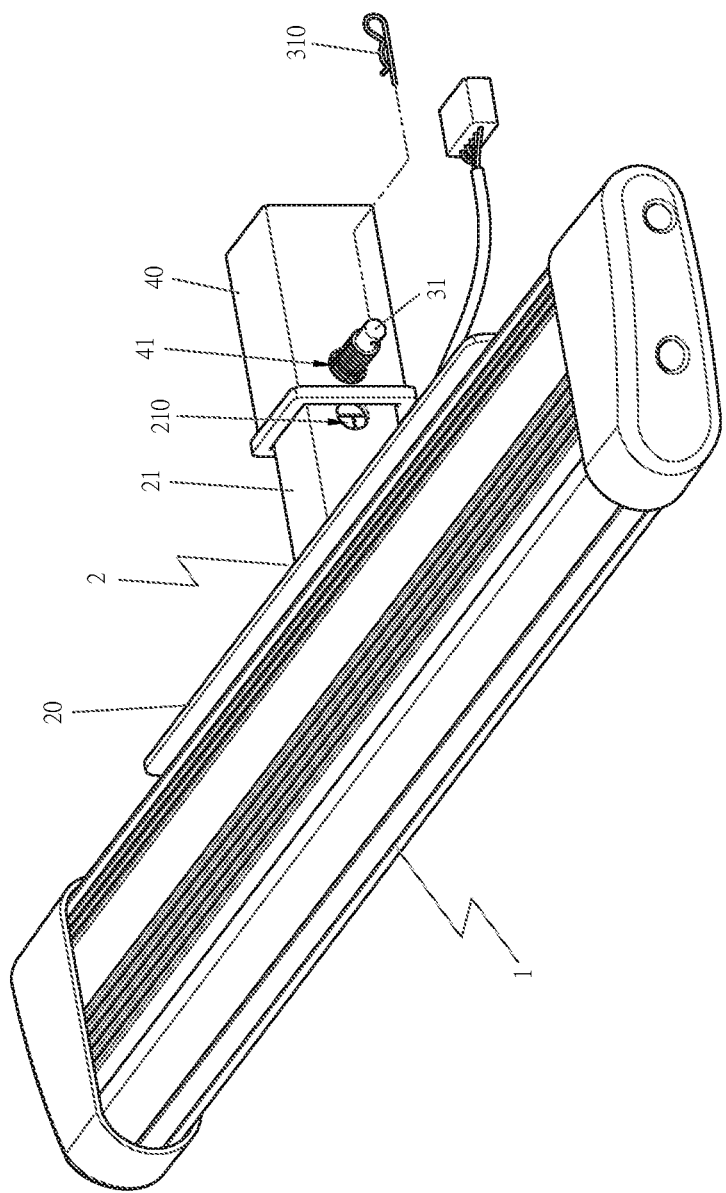
FIG. 2 is a three-dimensional view in the present invention.
Figure 3:
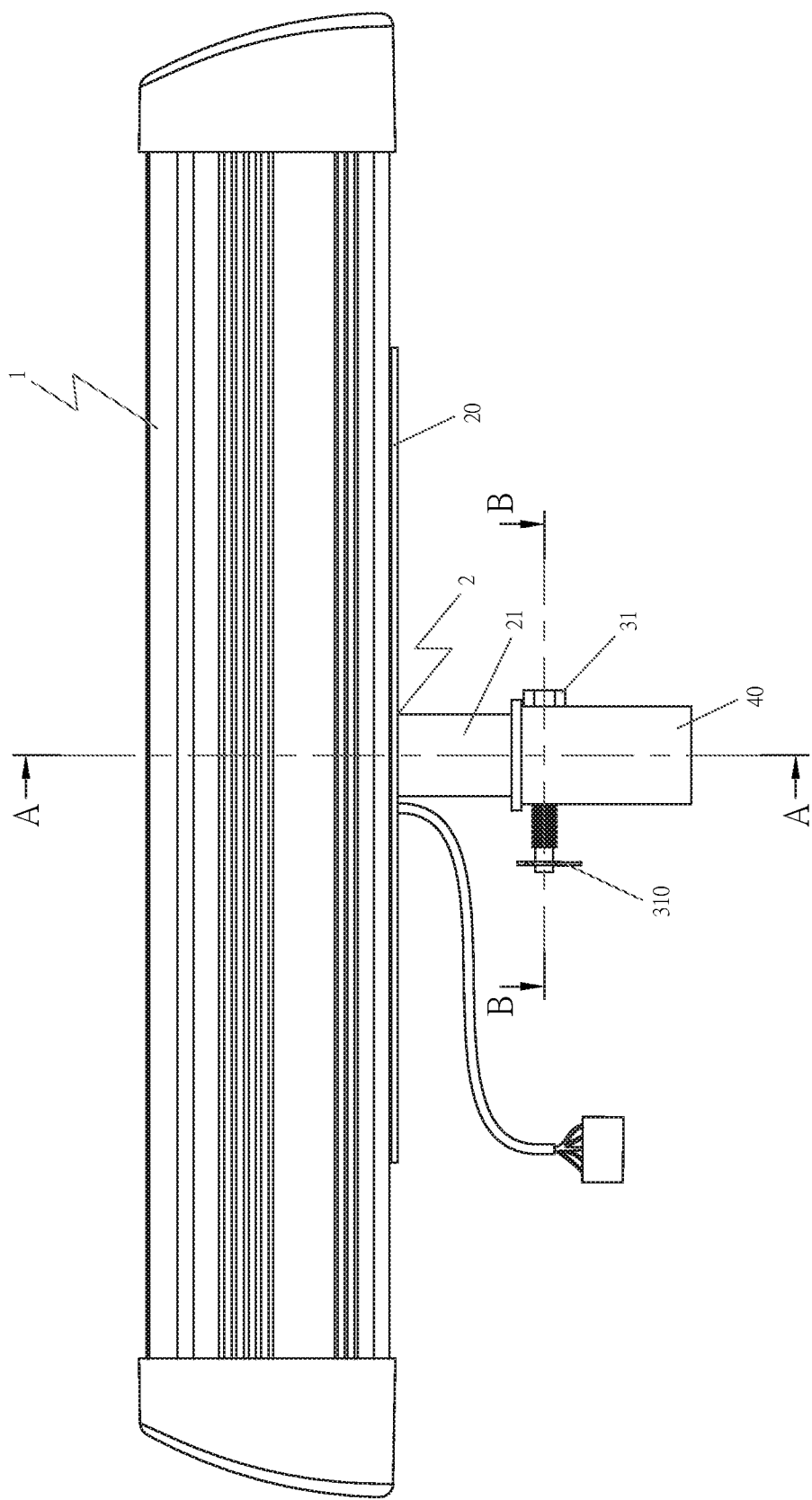
FIG. 3 is a top view of the first embodiment of the step assembly in the present invention.
Figure 4:
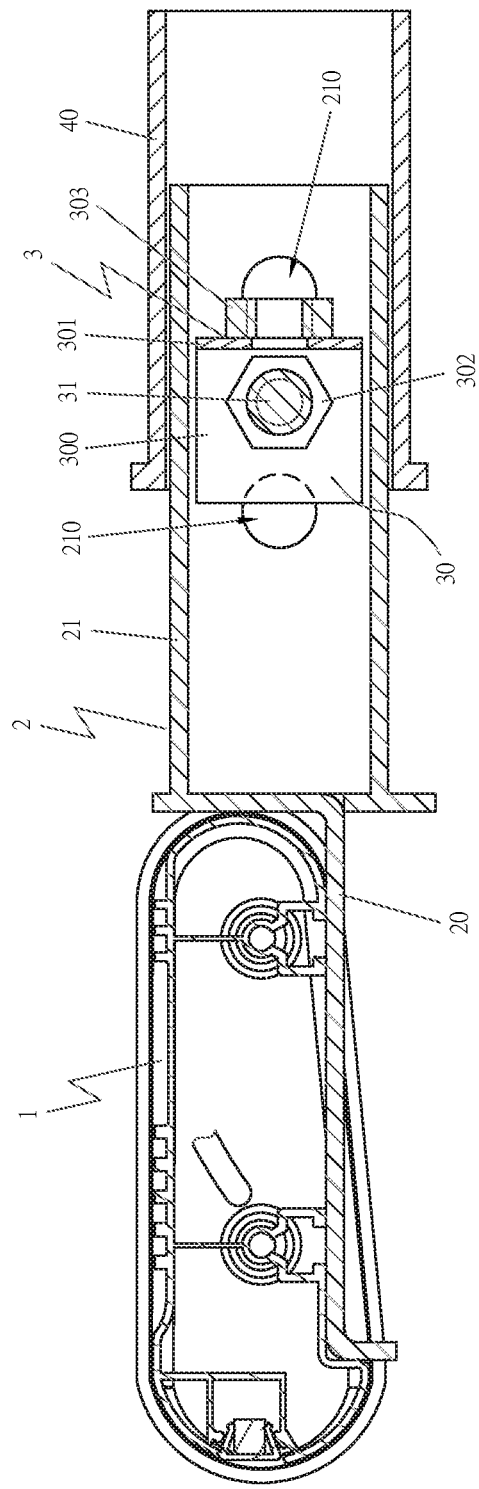
FIG. 4 is an sectional view of A-A shown in FIG. 3.
Figure 5:
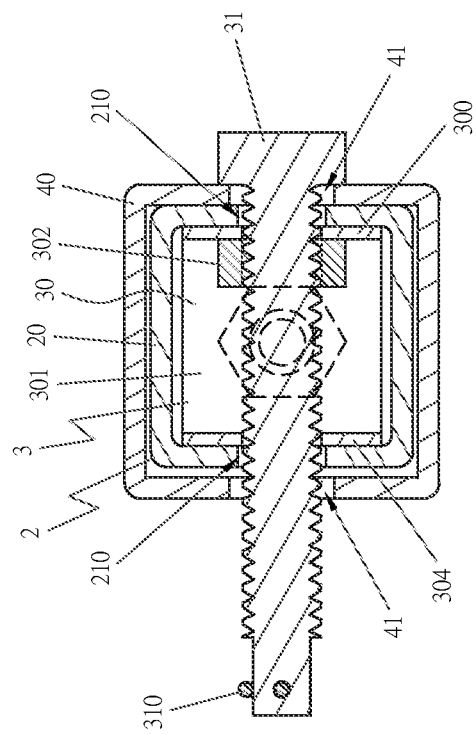
FIG. 5 is an sectional view of B-B shown in FIG. 3.
Figure 6:
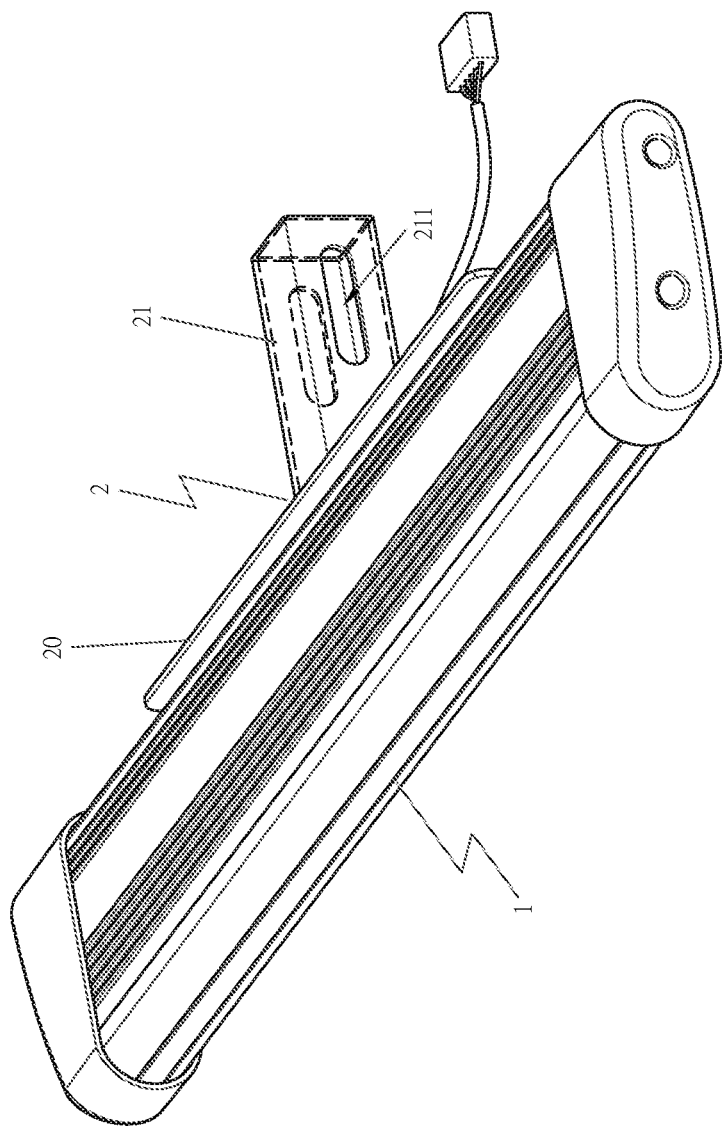
FIG. 6 is a schematic view of the frame member having a long slot in the present invention.

The step support 2 is provided with a base 20 for setting with the step assembly 1, the base 20 may be a folding base and the step assembly 1 may be a step provided with various electronic devices (e.g., LED lights, reversing radar, cameras, antennas, or signal receivers). A frame member 21 is provided on the rear side of the base 20, which is used to insert inside the receiver hitch 40 of the truck 4. The foregoing frame member 21 is set with a plurality of perforations 210, the place of each perforation 210 is corresponded to the place of the pin opening 41 of the receiver hitch 40 so that the depth of the frame member 21 inserted into the receiver hitch 40 can be adjusted as needed. As shown in FIG. 6, the foregoing perforations 210 may be a long slot 211 to make the frame element 21 has a stepless adjustment function.

The fixing member 3 is provided with a clamp body 30 and a threaded bolt 31. As shown in FIGS. 7 to 10, the clamp body 30 is set with a clip plate 300 and a push plate 301 which are arranged perpendicular to each other, the clip plate 300 and the push plate 301 are provided with a screw nut 302

Figure 10:
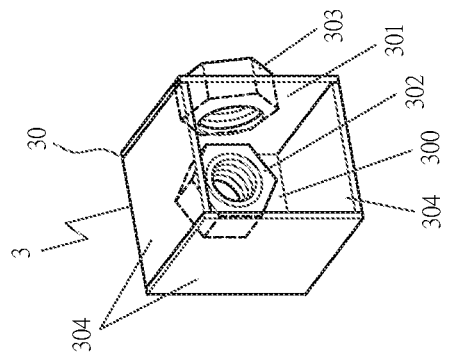
FIG. 10 is a three-dimensional view of the fourth embodiment of the clamp body in the present invention.
Figure 9:
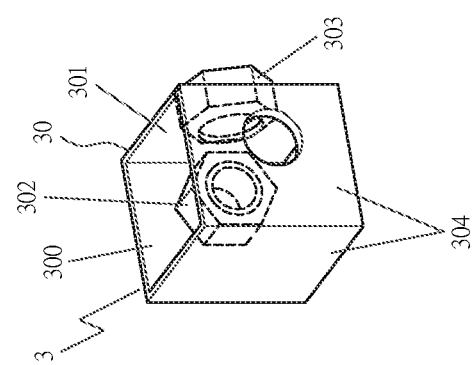
FIG. 9 is a three-dimensional view of the third embodiment of the clamp body in the present invention.
Figure 8:
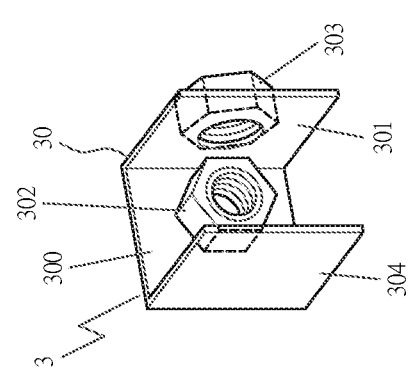
FIG. 8 is a three-dimensional view of the second embodiment of the clamp body in the present invention.
Figure 7:
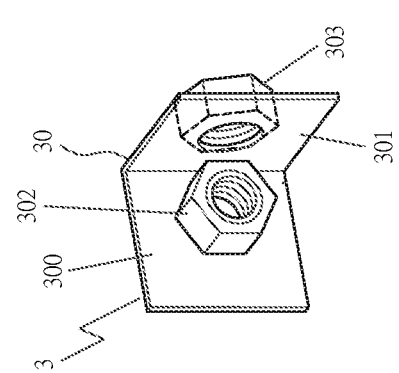
FIG. 7 is a three-dimensional view of the first embodiment of the clamp body in the present invention.
Figure 11:
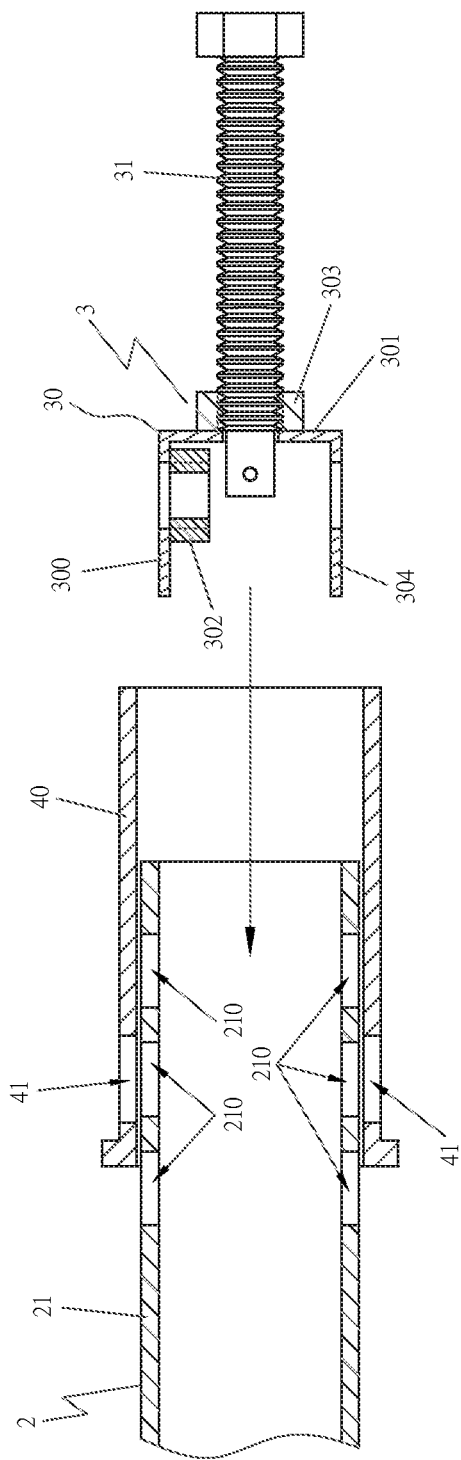
FIG. 11 is an installation operation view of the fixing member in the present invention.
Figure 12:
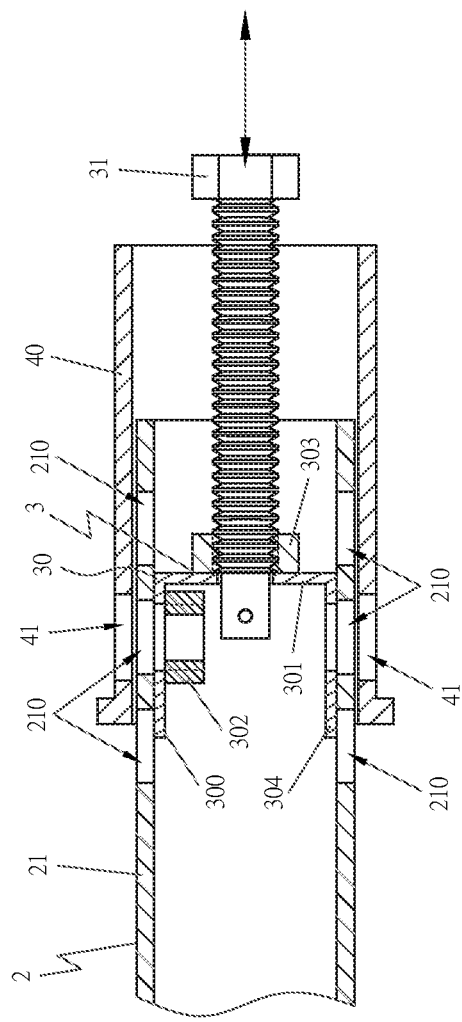
FIG. 12 is an installation operation view of the fixing member in the present invention.
Figure 13:
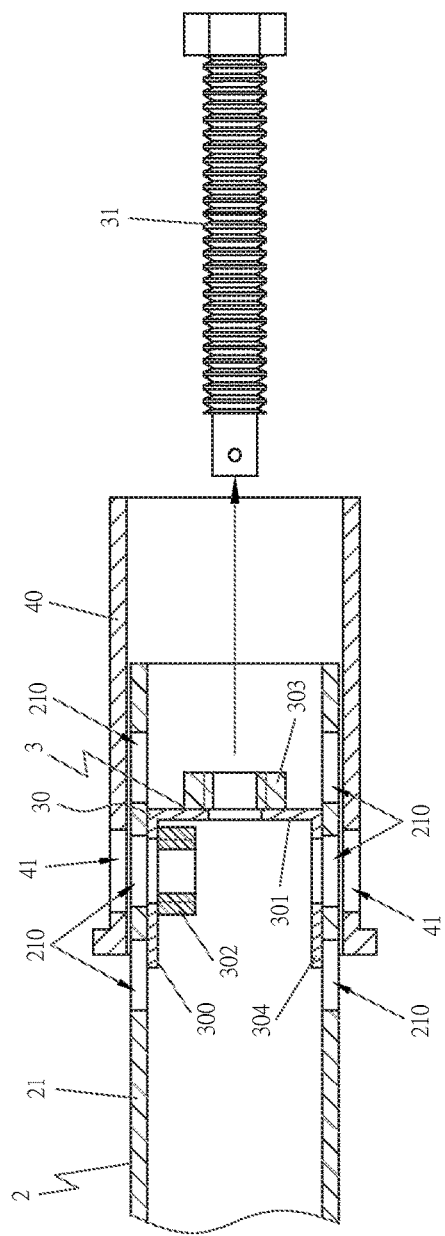
FIG. 13 is an installation operation view of the fixing member in the present invention.
Figure 14:
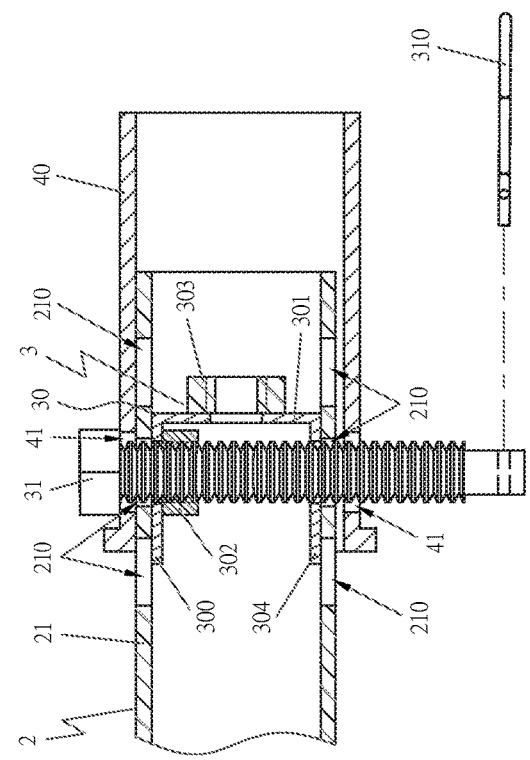
FIG. 14 is an installation operation view of the fixing member in the present invention.
Figure 17:
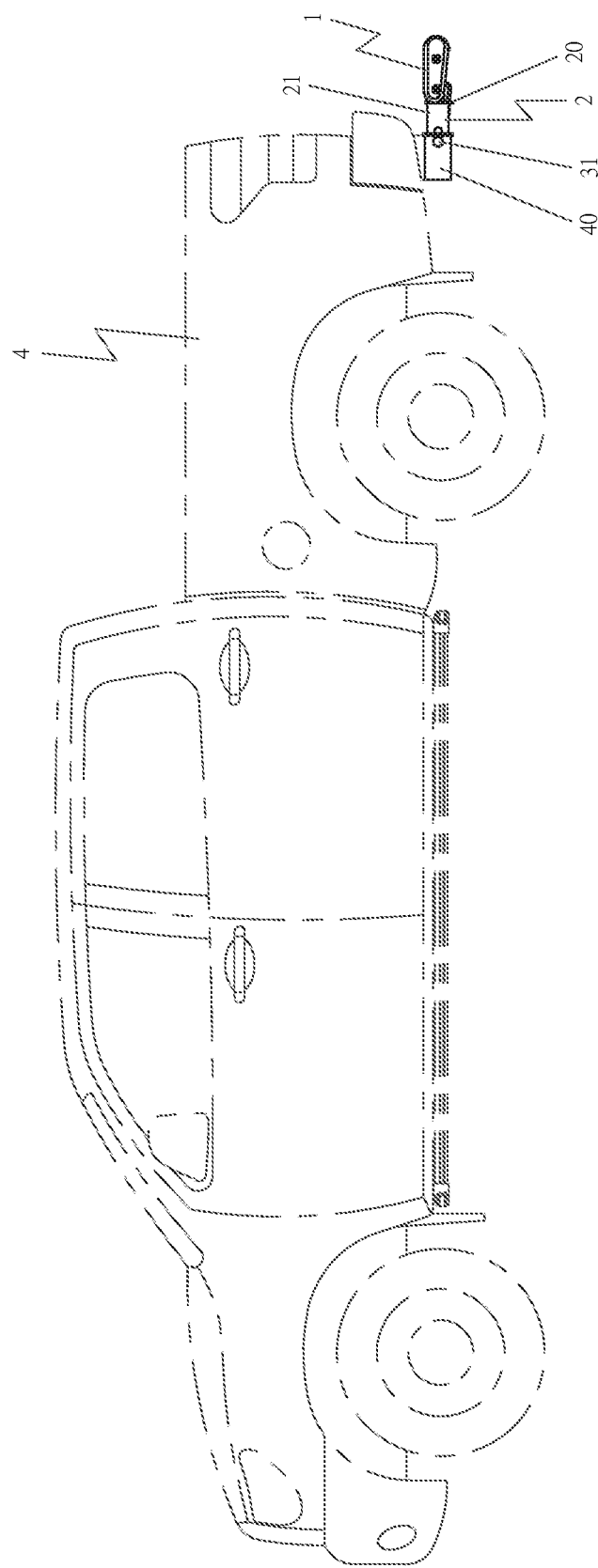
FIG. 17 is an application example of the step installation structure in the present invention.

、303 thereon separately, so that the threaded bolt 31 can lock the fixing member 3 by the screw nut 302、303. As shown in FIGS. 8 to 10, the clamp body 30 may be provided with at least one support plate 304 to increase the structural strength of the fixing member 3. As shown in FIGS. 14 to 16, the end of the threaded bolt 31 is provided with an anti-shedding member 310 to prevent the threaded bolt 31 from falling off due to severe vibration, the anti-shedding member 310 may be a screw nut, or a pin structure, or a combination of a screw nut and a pin structure.

As shown in FIGS. 11 to 16, when the user wants to mount the step installation structure of the present invention in the pickup truck. First, the step assembly 1 is mounted on the base 20 of the step support 2. Second, the frame member 21 of the step support 2 is inserted into the receiver hitch 40 of the pickup truck 4 and adjusting the insertion depth and the place of the perforations 210 and the pin opening 41 to the proper position. Third, the clamp body 30 is inserted into the frame member 21 from the other opening of the receiver hitch 40, the clamp body 30 can be pre-locked part of the threaded bolt 31 into the screw nut 303 of the push plate 301 so that the user can hold the threaded bolt 31 and align the screw nut 302 of the clip plate 300 with the perforations 210 and the pin opening 41. Fourth, to remove the threaded bolt 31 and lock it into the pin opening 41, the perforations 210 and the screw nut 302 to tightly clamp one side of the frame member 21 and the receiver hitch 40 between the head of threaded bolt 31 and the clip plate 300 of the clamp body 30. Fifth, to fix the anti-shedding member 310 at the end of the threaded bolt 31 to complete the step installation of the pickup truck.

Therefore, the present invention utilizes the innovative fixing member 3 to mount the step support 2 more securely with the truck, and the installation method is very simple and convenient and can enhance the safety and durability of the step. Evidently this invention has tangible benefits and tallies with progressiveness and novelty demanded by patent laws.

While the preferred embodiments of this invention have been described above, it will be recognized and understood that various modifications may be made therein and appended claims are intended to cover all such modifications that may fall within the spirit and scope of the invention.

What is claimed is:

1. A step installation structure of a truck comprising a step support and a fixing member, wherein:
    the step support comprises a base for connecting with a step assembly, and a frame member provided on a rear side of the base and configured to be inserted into a receiver hitch of the truck; the frame member has a sidewall defining a hollow channel and a plurality of perforations are formed on the sidewall, a position of each perforation corresponds to a position of a pin opening of the receiver hitch so that a depth of the frame member inserted into the receiver hitch can be adjusted;
    the fixing member comprises a clamp body and a threaded bolt, the clamp body is configured to be inserted into the hollow channel of the frame member when assembled, and comprises a clip plate and a push plate which are arranged perpendicular to each other, the clip plate is provided with a screw nut thereon, the screw nut of the clip plate matches with the threaded bolt so that the screw nut of the clip plate and the threaded bolt clamp the frame member and the receiver hitch together; one end of the threaded bolt is provided with an anti-shedding member to prevent the threaded bolt from falling off due to severe vibration;
    wherein the push plate is perpendicular to an axis of the hollow channel when assembled and is provided with a screw nut thereon matching with the threaded bolt, the threaded bolt is screwed into the screw nut of the push plate when assembling so that a user can hold the threaded bolt to align the screw nut of the clip plate with the perforations and the pin opening.

2. The step installation structure of the truck according to claim 1, wherein said base is a folding base.

3. The step installation structure of the truck according to claim 1, wherein the step assembly is provided with one or more of LED lights, a reversing radar, a camera, an antenna, or a signal receiver.

4. The step installation structure of the truck according to claim 1, wherein the clamp body further comprises at least one support plate to increase the structural strength of the fixing member.

5. The step installation structure of the truck according to claim 1, wherein-said anti-shedding member is a screw nut.

6. The step installation structure of the truck according to claim 1, wherein said anti-shedding member is a pin structure.

7. The step installation structure of the truck according to claim 1, wherein said anti-shedding member is a combination of a screw nut and a pin structure.

8. A step installation structure of a truck comprising a step support and a fixing member, wherein:
    the step support comprises a base for connecting with a step assembly, and a frame member provided on a rear side of the base and configured to be inserted into a receiver hitch of the truck; the frame member has a sidewall defining a hollow channel and a long slot is formed on the sidewall, the long slot corresponds to a pin opening of the receiver hitch so that the depth of the frame member inserted into the receiver hitch can be adjusted continuously;
    the fixing member comprises a clamp body and a threaded bolt, the clamp body is configured to be inserted into the hollow channel of the frame member when assembled, the clamp body comprises a clip plate and a push plate which are arranged perpendicular to each other, the clip plate is provided with a screw nut thereon, the screw nut of the clip plate matches with the threaded bolt so that the screw nut of the clip plate and the threaded bolt can clamp the frame member and the receiver hitch together; one end of the threaded bolt is provided with an anti-shedding member to prevent the threaded bolt from falling off due to severe vibration;
    wherein the push plate is perpendicular to an axis of the hollow channel when assembled and is provided with a screw nut thereon, the threaded bolt can be screwed into the screw nut of the push plate so that a user can hold the threaded bolt to align the screw nut of the clip plate with the long slot and the pin opening.

9. The step installation structure of the truck according to claim 8, wherein said base is a folding base.

10. The step installation structure of the truck according to claim 8, wherein the step assembly is provided with one or more of LED lights, a reversing radar, a camera, an antenna, or a signal receiver.

11. The step installation structure of the truck according to claim 8, wherein the clamp body further comprises at least one support plate to increase the structural strength of the fixing member.

12. The step installation structure of the truck according to claim 8, wherein said anti-shedding member is a screw nut.

13. The step installation structure of the truck according to claim 8, wherein said anti-shedding member is a pin structure.

14. The step installation structure of the truck according to claim 8, wherein said anti-shedding member is a combination of a screw nut and a pin structure.

* * * * *